(12) United States Patent
Tomlinson

(10) Patent No.: US 6,866,494 B2
(45) Date of Patent: Mar. 15, 2005

(54) DEVICE FOR PRODUCING A TWO-PART TIRE LAYER

(75) Inventor: Gordon Malcom Tomlinson, Rome (IT)

(73) Assignee: Bridgestone Corporation, Tokyo (JP)

(*) Notice: Subject to any disclaimer, the term of this patent is extended or adjusted under 35 U.S.C. 154(b) by 443 days.

(21) Appl. No.: 10/000,376

(22) Filed: Oct. 31, 2001

(65) Prior Publication Data

US 2002/0053384 A1 May 9, 2002

(30) Foreign Application Priority Data

Nov. 7, 2000 (IT) ..................................... TO2000A1048

(51) Int. Cl.[7] .............................................. B29C 47/06
(52) U.S. Cl. .............................. 425/131.1; 425/133.5; 425/190; 425/380; 425/463; 425/467; 156/394.1
(58) Field of Search .................. 425/131.1, 133.5, 425/190, 192 R, 380, 463, 467; 156/123, 394.1

(56) References Cited

U.S. PATENT DOCUMENTS

| | | | |
|---|---|---|---|
| 4,917,164 A | 4/1990 | Tsuda et al. ................ | 152/517 |
| 5,424,019 A | * 6/1995 | Miyakawa et al. ..... | 264/177.17 |
| 6,294,119 B1 | * 9/2001 | Nakamura ............. | 264/173.12 |

FOREIGN PATENT DOCUMENTS

| EP | 0 925 903 | 6/1999 |
|---|---|---|
| EP | 1 103 391 | 5/2001 |
| JP | 04 208443 | 7/1992 |
| JP | 2000 351306 | 12/2000 |

* cited by examiner

Primary Examiner—Joseph S. Del Sole
(74) Attorney, Agent, or Firm—Michael Sand; Michael R. Huber

(57) ABSTRACT

In a road vehicle tire, a two-part layer (2) of elastomeric material is preassembled by co-extruding a first and a second strip (19, 16) through a preforming plate die (26), through which extends at least one pair (27) of tapered flow channels (25a, 25b) having offset, side by side inlets (28, 29) with respective superimposed adjacent lateral portions (30, 32), and substantially coplanar outlets (33, 34) with respective adjacent lateral portions (35, 38) interconnected to define, between the two strips (19, 16), an L-shaped joint (20) wherein a lateral portion (21) of the second strip (16) has an edge (17) substantially contacting a lateral shoulder (22) of the first strip (19), and is superimposed on a thin annular appendix (23) projecting from the shoulder (22) of the first strip (19).

15 Claims, 3 Drawing Sheets

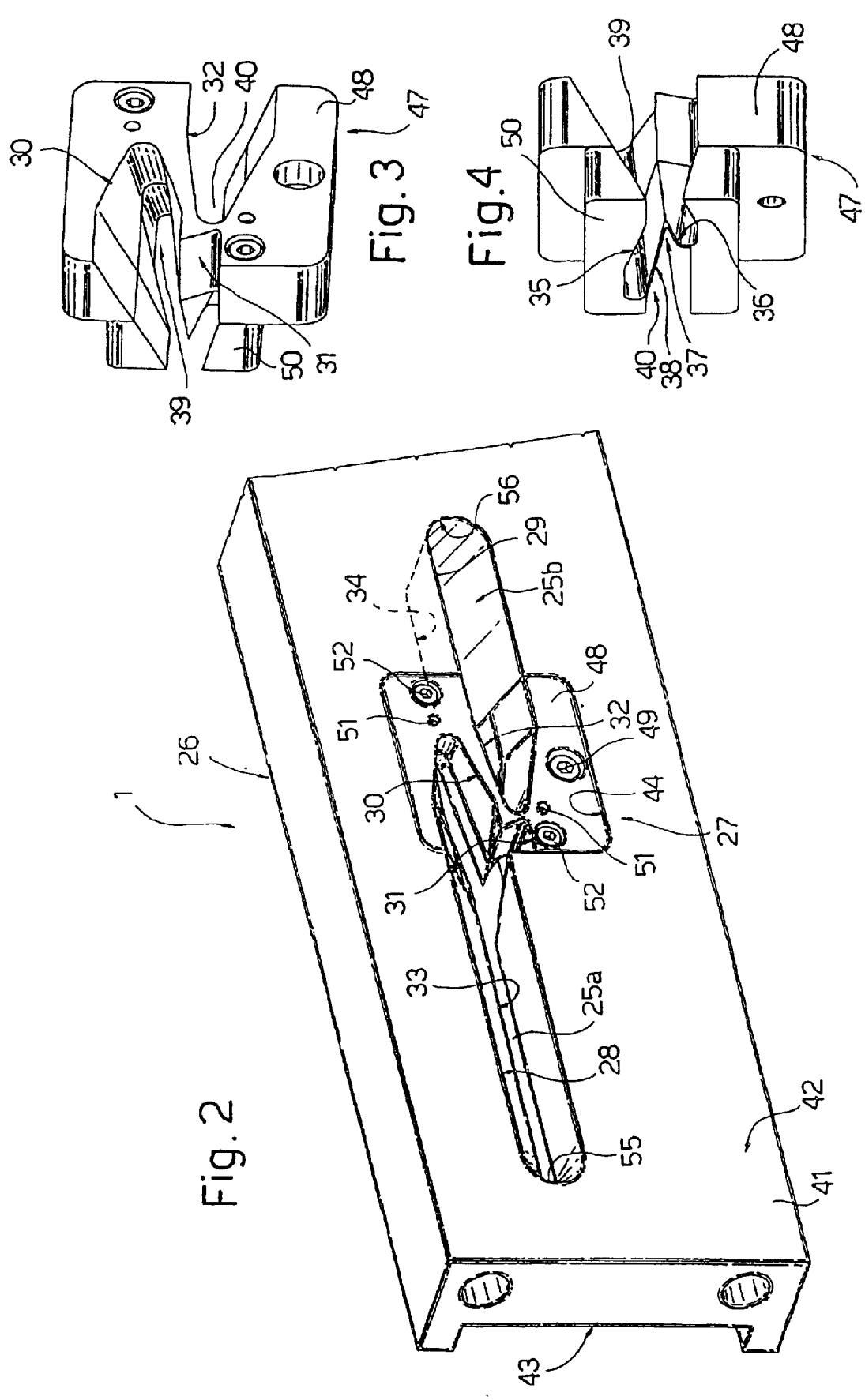

DEVICE FOR PRODUCING A TWO-PART TIRE LAYER

FIELD OF THE INVENTION

The present invention relates to a method of producing a two-part layer of a road vehicle tire.

BACKGROUND OF THE INVENTION

The present invention may be used to advantage for producing tire sidewall outer coating skims, to which the following description refers purely by way of example. Such a coating skim is normally defined by an abrasion strip and a lateral-wall strip arranged side by side and connected by a joint.

As any expert knows, a two-part layer of the above type is produced by co-extruding the two strips of elastomeric material side by side and feeding the two strips to a die, by which they are so gripped as to adhere to each other along the facing lateral edges.

The joint between the two strips is normally a straightforward butt joint, which has proved fairly unreliable when subjected normally to relatively severe stress by the nature and/or shape of the internal components of the tire adjacent to the joint.

The present invention provides a method of producing a two-part layer, designed to produce, cheaply, easily and by co-extrusion, stronger, more reliable joints between the two parts than is currently possible.

SUMMARY OF THE INVENTION

What the art needs is a method of producing a two-part layer of a road vehicle tire, whereby said layer is produced by co-extruding a first and a second strip through a preforming die. At least one pair of tapered flow channels are formed in the die and are formed by offset, side by side inlets having respective superimposed adjacent lateral portions, and substantially coplanar outlets. The outlets are formed with adjacent lateral portions which are interconnected as to define, between the two strips, an L-shaped joint. A lateral portion of the second strip has an edge substantially contacting a lateral shoulder of the first strip, and is superimposed on a thin annular appendix projecting from the shoulder of the first strip.

The present invention also relates to a device for producing a two-part layer.

According to the present invention, there is provided a device for producing a two-part layer of a road vehicle tire. The device includes a preforming plate die, through which extends at least one pair of tapered flow channels for co-extruding a first and second strip respectively. The two flow channels are formed by respective offset, side by side inlets having respective superimposed adjacent lateral portions, and respective substantially coplanar outlets. The outlets are formed with lateral portions, which are interconnected as to define, between said two strips, an L-shaped joint. A lateral portion of the second strip has an edge substantially contacting a lateral shoulder of the first strip, and is superimposed on a thin annular appendix projecting from the shoulder of the first strip.

The present invention also relates to a tire comprising a two-part layer produced according to the method and by means of the device defined above.

According to the present invention, there is provided a road vehicle tire comprising two sidewalls, each having an outer coating skim defined by a co-extruded first later-wall strip and second abrasion strip. The second strip has a lateral portion with a lateral edge. The first strip has an annular lateral shoulder and a thin annular appendix projecting from the shoulder. The two strips are connected to each other by an L-shaped joint wherein the lateral edge is positioned substantially contacting said lateral shoulder, and said lateral portion of said second strip is superimposed on said annular appendix.

BRIEF DESCRIPTION OF THE DRAWINGS

A non-limiting embodiment of the invention will be described by way of example with reference to the accompanying drawings, in which:

FIG. 2 shows a perspective view of the input side of the device of FIG. 1;

FIG. 3 shows a perspective view of the input side of the device of FIG. 1;

FIG. 4 shows a perspective view of the output side of the device of FIG. 1; and

Similar numerals refer to similar parts throughout the drawings.

EMBODIMENTS OF THE INVENTION

Figure 1:
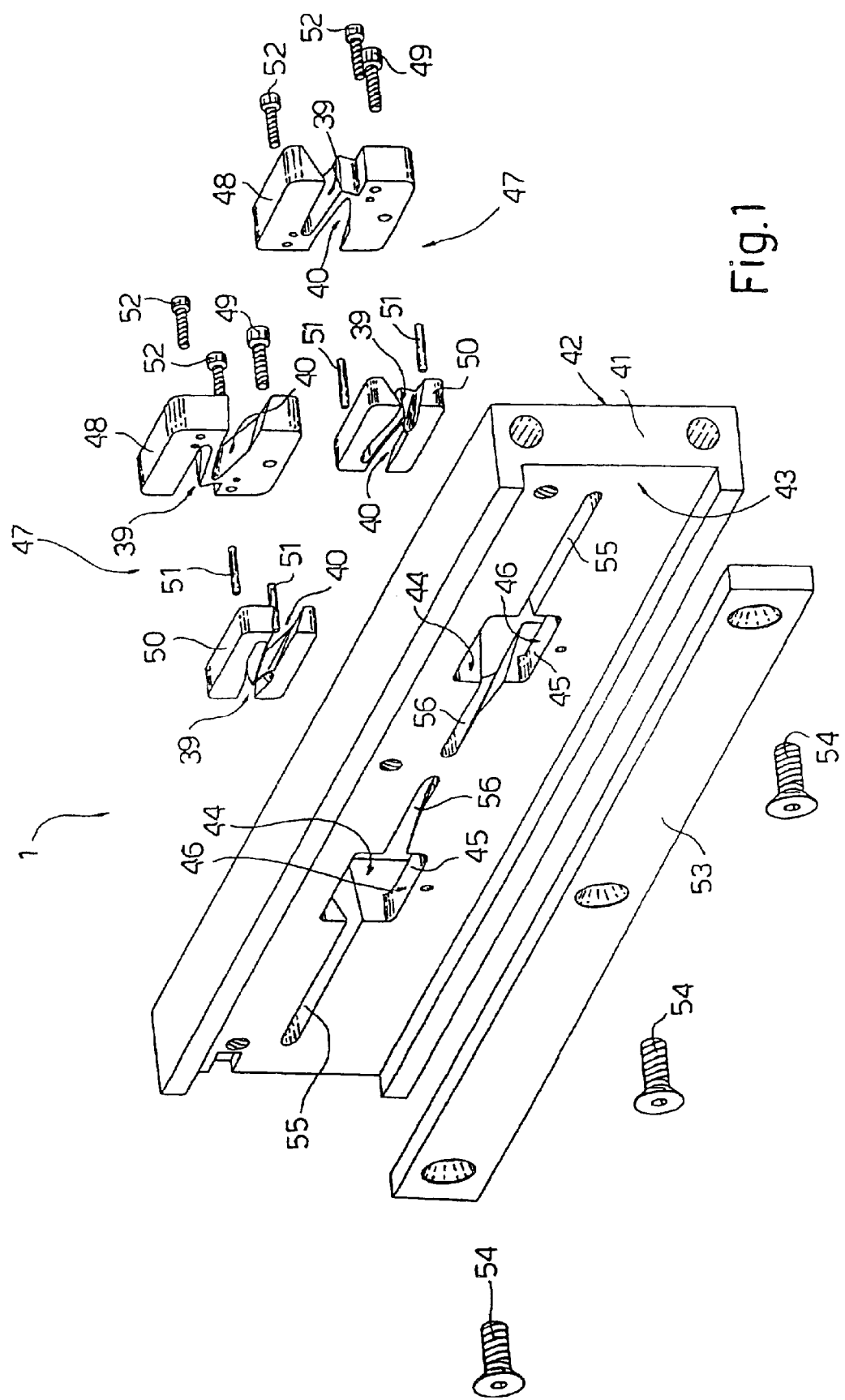
FIG. 1 shows an exploded perspective view, of the output side of the extrusion device according to the present invention.
Figure 5:
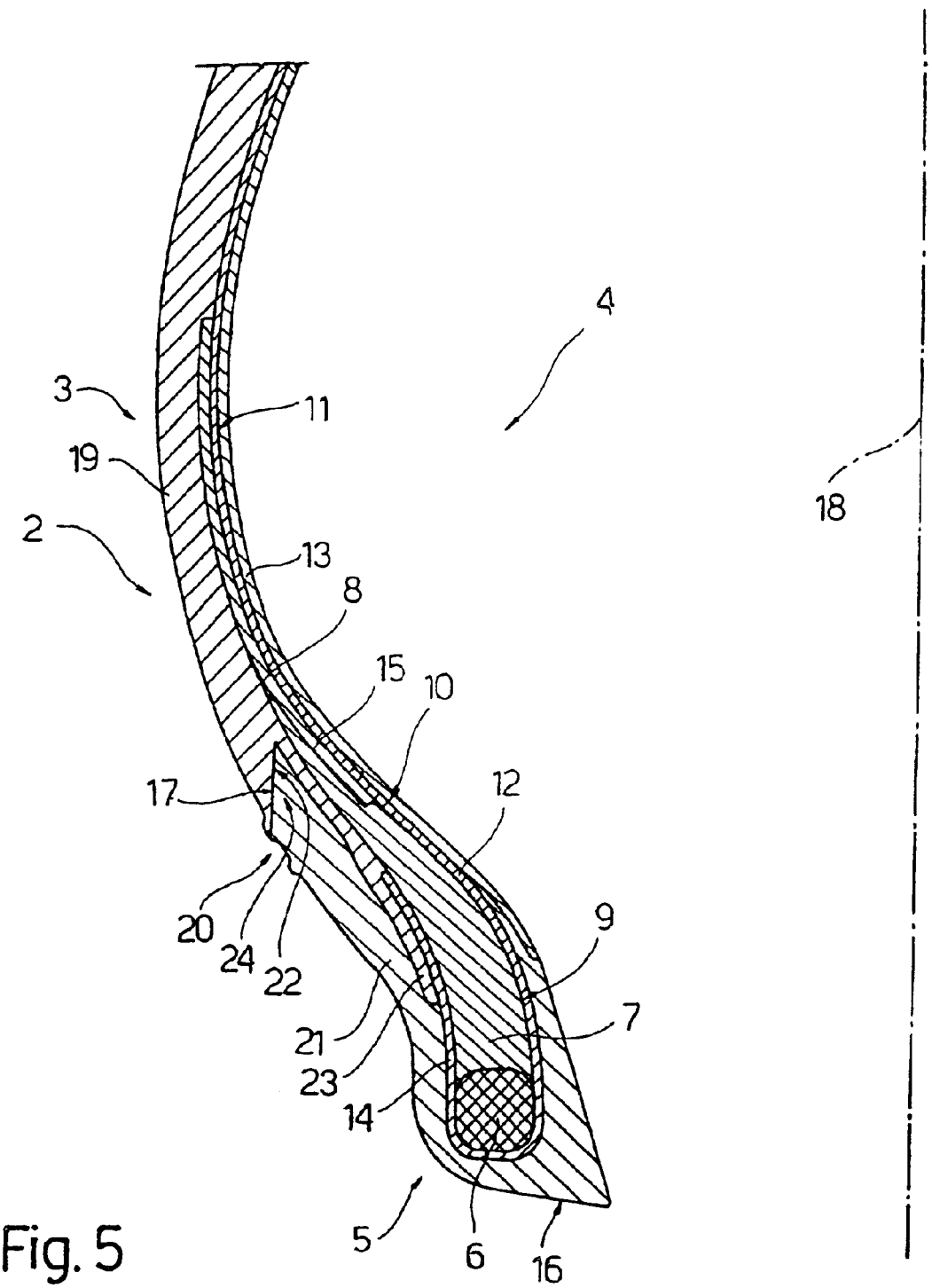
FIG. 5 shows a partial cross section of a tire produced using the extrusion device according to the present invention.

Number 1 in FIG. 1 indicates as a whole an extrusion device for extruding two layers of elastomeric material, each of which, as shown in FIG. 5, defines a coating skim 2 of a respective sidewall 3 (only one shown in FIG. 5) of a road vehicle tire 4.

With reference to FIG. 5, each sidewall 3 of tire 4 comprises, at the radially inner end, a bead 5 in turn comprising a bead bundle 6 coaxial with tire 4 and having a substantially triangular-section bead filler 7 with its base facing the outer lateral surface of bead bundle 6, and a vertex 8 facing radially outwards. Together with bead bundle 6, bead filler 7 defines a bead assembly 9, about which extends a respective lateral portion 10 of a body ply 11. Lateral portion 10 comprises an axially inner portion 12 lined with an innerliner 13; and a turn-up portion 14 located axially outwards of bead assembly 9, which is continued along sidewall 3 by a stiffening strip 15 contacting lateral portion 10 and extending radially outwards of vertex 8 along sidewall 3.

Each skim 2 coats the relative sidewall 3 externally and extends about relative bead assembly 9. The skims 2 are connected to a relative lateral edge of innerliner 13, and include an annular lateral-wall strip 19 and an annular abrasion strip 16. Abrasion strip 16 is turned up into a U about relative bead assembly 9 and is defined laterally, on the axially outer side of relative bead assembly 9, by a sloping annular edge 17 substantially parallel to an equatorial plane 18 of tire 4.

Lateral-wall strip 19 is connected to abrasion strip 16 by an L-shaped joint 20. An annular lateral portion 21 of abrasion strip 16 extends with an edge 17 contacting a lateral annular shoulder 22 of lateral-wall strip 19. Lateral portion 21 is superimposed on a thin annular appendix 23 projecting from shoulder 22 and facing relative bead bundle 6. Obviously, shoulder 22 slopes at an angle complementary to that of relative edge 17, and defines, with relative appendix 23, a recess 24 engaged by a triangular peripheral portion of lateral portion 21 of abrasion strip 16.

With reference to FIGS. 1 to 4, extrusion device 1 comprises two known double-outlet extruders (not shown). Each outlet of the extruder feeds, in a known manner not shown, a strip (not shown) of elastomeric material to a respective preforming channel 25. Preforming channels 25 are formed through a preforming plate die 26, which forms part of extrusion device 1. The four channels 25 of die 26 are arranged in side by side pairs 27 with each pair 27 comprising a channel 25a and a channel 25b arranged in a substantially side by side arrangement explained in detail below. The outlets of channels 25a and 25b in each pair 27 of channels 25 communicate with a respective single known channel (not shown) of a known end die (not shown) for forming two coating skims 2. Skims 2 are arranged specularly with respect to each other for coating respective sidewalls 3 of tire 4. The two channels 25b are formed through die 26 in a substantially intermediate position with respect to the two channels 25a, so that channels 25 in each pair 27 are arranged specularly with respect to channels 25 in the other pair 27.

As shown in FIG. 2, the two channels 25a and 25b are tapered and have respective substantially elongated rectangular inlets 28 and 29 arranged side by side in parallel, offset planes. At the end facing inlet 29, inlet 28 has a lateral portion 30, which is defined internally by a recess 31 extending crosswise to the plane of inlet 28 and towards inlet 29, and is superimposed on a lateral portion 32 of inlet 29. Lateral portion 32 terminates facing and to the side of recess 31.

As shown in FIG. 2, the two channels 25a and 25b have respective substantially elongated rectangular outlets 33 and 34 arranged side by side in substantially the same plane. At the end facing outlet 34, outlet 33 has a lateral portion 35 (best seen in FIG. 4), which corresponds to lateral portion 30 of inlet 28, defines appendix 23 of lateral-wall strip 19, and is defined internally by a recess 36 communicating with and corresponding to recess 31. Recess 36 defines shoulder 22 and slopes with respect to the rest of outlet 33 to define, together with lateral portion 35, an acute dihedral 37. The dihedral 37 is engaged by a lateral portion 38 of outlet 34 corresponding to lateral portion 32 of inlet 29, so that the two lateral portions 35 and 38 are interconnected by an L-shaped joint corresponding to respective L-shaped joint 20.

Lateral portions 30 and 35 define the inlet and outlet ends of a lateral portion 39 of channel 25a, while lateral portions 32 and 38 define the inlet and outlet ends of a lateral portion 40 of channel 25b.

With reference to FIG. 1, die 26 comprises a substantially rectangular plate 41 having a substantially horizontal longitudinal axis. Die 26 is defined by an input surface 42 and an output surface 43 parallel to and opposite each other. For each pair 27 of channels 25, die 26 is formed with a substantially rectangular cavity 44 formed through surface 42 and closed by an end wall 45. End wall 45 is formed with a substantially rectangular through opening 46 which is substantially the same width as cavity 44, is smaller in height than cavity 44, and the top end of which substantially coincides with that of cavity 44.

Cavity 44 and relative opening 46 are engaged by a block 47 (shown in FIGS. 3 and 4) comprising a plate 48, which is inserted inside cavity 44 and fixed to wall 45 by a screw 49; and a plate 50, which is fitted through opening 46. As shown in FIG. 1, plate 50 is fixed in the correct position to plate 48 by two pins 51 and two screws 52. Plate 50 is releasably locked against plate 48 and inside opening 46 by a retaining rod 53, which is fixed to surface 43 by screws 54, so that a top peripheral portion of the rod partly closes opening 46.

As shown in FIGS. 3 and 4, lateral portions 39 and 40 of respective channels 25a and 25b are formed through block 47, while the remaining portions of channels 25a and 25b are defined by respective slots 55 and 56 formed through plate 41. More specifically, the input portions of lateral portions 39 and 40 are formed through plate 48, while the output portions of lateral portions 39 and 40 are formed through plate 50.

Extrusion device 1 described provides not only for pre-assembling each abrasion strip 16 to the relative lateral-wall strip 19, thus greatly reducing the assembly time of tire 4, but also for producing an extremely precise L-shaped joint 20, which, given its structure, is easily capable of absorbing any stress transmitted by the relative turn-up portion 14 of body ply 11, and enables the use of body plies 11 with narrow turn-up portions 14.

The easy-change blocks 47 of die 26 described provide for both changing the wear parts of die 26 cheaply and easily, and for altering the shape of joints 20 as required without changing plate 41.

Finally, forming each block 47 by superimposing respective plates 48 and 50 makes lateral portions 39 and 40 of respective channels 25a and 25b easier to produce, and makes die 26 much easier to maintain and clean.

What is claimed is:

1. A device for producing a two-part layer (2) of a road vehicle tire (4), the device comprising:
   a preforming plate die (26), through which extends at least one pair (27) of tapered flow channels (25a, 25b) for co-extruding a first and second strip (19, 16) respectively;
   said two channels (25a, 25b) comprising respective offset, side by side inlets (28, 29), said inlets (28, 29) having respective superimposed adjacent lateral portions (30, 32);
   respective substantially coplanar outlets (33, 34) said outlets (33, 34) having respective adjacent lateral portions (35, 38) so formed and interconnected as to define, between said two strips (19, 16), an L-shaped joint (20); and
   wherein a lateral portion (21) of the second strip (16) has an edge (17) substantially contacting a lateral shoulder (22) of the first strip (19), and is superimposed on a thin annular appendix (23) projecting from the shoulder (22) of the first strip (19).

2. A device as claimed in claim 1, wherein sad lateral portions (30, 32) of said inlets (28, 29) define, together with the respective said lateral portions (35, 38) of said outlets (33, 34), the opposite ends of respective lateral portions (39, 40) of the respective said channels (25a, 25b); said die (26) comprising a flat supporting plate (41), and, for each said pair (27) of said channels (25a, 25b), a block (47) fitted removably through said plate (41); said lateral portions (39, 40) of said channels (25a, 25b) being formed through said block (47); and said channels (25a, 25b) having the remaining portions defined by respective through slots (55, 56) formed through the supporting plate (41).

3. A device as claimed in claim 2, wherein said block (47) comprises a first and second plate (48, 50) superimposed and connected to each other; input portions of said lateral portions (39, 40) of said channels (25a, 25b) being formed through said first plate (48); and output portions of said lateral portions (39, 40) of said channels (25a, 25b) being formed through said second plate (50).

4. A device as claimed in claim 3, wherein said supporting plate (41) comprises, for each said block (47), a substantially rectangular cavity (44), which is engaged by said first plate (48) and closed by an end wall (45) through which is formed a substantially rectangular through opening (46) engaged by said second plate (50).

5. A device as claimed in claim 4, wherein said opening (46) is smaller in height than said cavity (44); said first plate (48) being positioned contacting said end wall (45), and being connected to the end wall (45) by removable fastening means (49).

6. A device for producing a two-part coating skin layer (2) of a sidewall of a road vehicle tire (4), the device comprising:

a preforming plate die (26), through which extends at least one pair (27) of tapered flow channels (25a, 25b) for co-extruding a lateral-wall strip (19) and an abrasion strip (16), respectively;

said two channels (25a, 25b) comprising respective offset, side by side inlets (28, 29), said inlets (28, 29) having respective superimposed adjacent lateral portions (30, 32);

respective substantially coplanar outlets (33, 34) said outlets (33, 34) having respective adjacent lateral portions (35, 38) so formed and interconnected as to define, between said strips (19, 16), an L-shaped joint (20); and wherein a lateral portion (21) of the abrasion strip (16) has an edge (17) substantially contacting a lateral shoulder (22) of the lateral-wall strip (19), and is superimposed on a thin annular appendix (23) projecting from the shoulder (22) of the lateral-wall strip (19).

7. A device as claimed in claim 6, wherein said lateral portions (30, 32) of said inlets (28, 29) define, together with the respective said lateral portions (35, 38) of said outlets (33, 34), the opposite ends of respective lateral portions (39, 40) of the respective said channels (25a, 25b); said die (26) comprising a flat supporting plate (41), and, for each said pair (27) of said channels (25a, 25b), a block (47) fitted removably through said plate (41); said lateral portions (39, 40) of said channels (25a, 25b) being formed through said block (47); and said channels (25a, 25b) having the remaining portions defined by respective through slots (55, 56) formed through the supporting plate (41).

8. A device as claimed in claim 7, wherein said block (47) comprises a first and a second plate (48, 50) superimposed and connected to each other; input portions of said lateral portions (39, 40) of said channels (25a, 25b) being formed through said first plate (48); and output portions of said lateral portions (39, 40) of said channels (25a, 25b) being formed through said second plate (50).

9. A device as claimed in claim 8, wherein said supporting plate (41) comprises, for each said block (47), a substantially rectangular cavity (44), which is engaged by said first plate (48) and closed by an end wall (45) through which is formed a substantially rectangular through opening (46) engaged by said second plate (50).

10. A device as claimed in claim 9, wherein said opening (46) is smaller in height than said cavity (44); said first plate (48) being positioned contacting said end wall (45), and being connected to the end wall (45) by removable fastening means (49).

11. A device as claimed in claim 1, wherein said preforming die (26) has two side by side said pairs (27) of flow channels (25a, 25b); and the two channels (25a, 25b) in each pair (27) being arranged specularly with respect to the two channels (25a, 25b) in the other pair (27).

12. A device as claimed in claim 11, wherein said lateral portions (30, 32) of said inlets (28, 29) define, together with the respective said lateral portions (35, 38) of said outlets (33, 34), the opposite ends of respective lateral portions (39, 40) of the respective said channels (25a, 25b); said die (26) comprising a flat supporting plate (41), and, for each said pair (27) of said channels (25a, 25b), a block (47) fitted removably through said plate (41); said lateral portions (39, 40) of said channels (25a, 25b) being formed through said block (47); and said channels (25a, 25b) having the remaining portions defined by respective through slots (55, 56) formed through the supporting plate (41).

13. A device as claimed in claim 12, wherein said block (47) comprises a first and second plate (48, 50) superimposed and connected to each other; input portions of said lateral portions (39, 40) of said channels (25a, 25b) being formed through said first plate (48); and output portions of said lateral portions (39, 40) of said channels (25a, 25b) being formed through said second plate (50).

14. A device as claimed in claim 13, wherein said supporting plate (41) comprises, for each said block (47), a substantially rectangular cavity (44), which is engaged by said first plate (48) and closed by an end wall (45) through which is formed a substantially rectangular through opening (46) engaged by said second plate (50).

15. A device as claimed in claim 14, wherein said opening (46) is smaller in height than said cavity (44); said first plate (48) being positioned contacting said end wall (45), and being connected to the end wall (45) by removable fastening means (49).

* * * * *